(12) United States Patent
Chao et al.

(10) Patent No.: US 11,559,164 B2
(45) Date of Patent: Jan. 24, 2023

(54) COAXIAL MICROWAVE ROTARY APPLICATOR FOR MATERIAL PROCESSING

(71) Applicant: National Tsing Hua University, Hsinchu (TW)

(72) Inventors: Hsein-Wen Chao, Taoyuan (TW); Tsun-Hsu Chang, Hsinchu (TW); Huan-Jun Guo, Kaohsiung (TW); Cheng-Hsuan Chan, Hsinchu County (TW); Po-Yen Chiu, New Taipei (TW); Yu-Tzu Chang, Kaohsiung (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 642 days.

(21) Appl. No.: 16/676,687

(22) Filed: Nov. 7, 2019

(65) Prior Publication Data

US 2020/0281395 A1 Sep. 10, 2020

(30) Foreign Application Priority Data

Mar. 6, 2019 (TW) .................................. 108107442

(51) Int. Cl.
*A47J 31/42* (2006.01)
*H05B 6/64* (2006.01)
(Continued)

(52) U.S. Cl.
CPC .............. *A47J 31/42* (2013.01); *A23N 12/10* (2013.01); *H05B 6/6402* (2013.01); *H05B 6/647* (2013.01); *H05B 6/6411* (2013.01); *H05B 6/80* (2013.01)

(58) Field of Classification Search
CPC ....... A47J 31/42; A23N 12/10; H05B 6/6402; H05B 6/6411
(Continued)

(56) References Cited

U.S. PATENT DOCUMENTS

| 4,450,758 A | * | 5/1984 | Belinkoff | .............. A47J 37/047 |
| | | | | 99/332 |
| 2004/0074400 A1 | * | 4/2004 | Song | ...................... A23N 12/10 |
| | | | | 99/483 |

(Continued)

FOREIGN PATENT DOCUMENTS

| KR | 20150146191 | * | 12/2015 | ............. A23N 12/10 |
| KR | 101779297 | * | 5/2016 | ............. A23N 12/10 |
| KR | 20160131362 | * | 11/2016 | ............. A23N 12/10 |

OTHER PUBLICATIONS

Machine Translation of KR20150146191; Jul. 2022 (Year: 2022).*
Machine Translation of KR20160131362; Jul. 2022 (Year: 2022).*
Machine Translation of KR101779297; Jul. 2022 (Year: 2022).*

*Primary Examiner* — Tu B Hoang
*Assistant Examiner* — Thomas J Ward

(57) ABSTRACT

Disclosures of the present invention describe a coaxial microwave rotary applicator for material processing, mainly comprising: a waveguide unit, a microwave generator connected to one end of the waveguide unit, a bearing unit, a chamber, a rotary shaft, a driver unit, a sampling unit. The bearing unit is connected to the waveguide unit through a non-rotary ring, and the chamber is connected to a rotary ring of the bearing unit, and the microwave generator is configured for supplying a microwave to the chamber. By such arrangements, it is able to uniformly heat a specific material disposed in the chamber by driving the chamber to rotate. It is worth noting that, a user is allowed to clearly observe the processing progress via the sampling unit during the heating process of the specific material.

7 Claims, 11 Drawing Sheets

(51) Int. Cl.
*H05B 6/80* (2006.01)
*A23N 12/10* (2006.01)

(58) Field of Classification Search
USPC .......................................................... 99/286
See application file for complete search history.

(56) References Cited

U.S. PATENT DOCUMENTS

2018/0317538 A1\* 11/2018 Chang .................. A23N 12/083
2018/0343913 A1\* 12/2018 Tun ........................ A23N 12/10

\* cited by examiner

COAXIAL MICROWAVE ROTARY APPLICATOR FOR MATERIAL PROCESSING

BACKGROUND OF THE INVENTION

1. Field of the Invention

The present invention relates to the technology filed of material processing apparatuses using microwave, and more particularly to a coaxial microwave rotary applicator for material processing.

2. Description of the Prior Art

Coffee, commonly brewed by using hot water to extract roasted coffee beans, is known one kind of the most popular beverage in the world. According to the statistical data reported by the Business Insider, coffee is worth over $100 billion worldwide. Moreover, unique smell and/or flavor dominate the value and quality of certain native coffee beans. However, an experienced barista should know that, different coffee roasting methods would also lead the native coffee beans to exhibit some special smell and flavor.

Heating device is known a principal coffee roaster, and there are two types of heat sources utilized by the conventional heating device for applying a coffee beans roasting process to coffee beans, including penetrating heat source and non-penetrating heat source. Because non-penetrating heat source indirectly heats coffee beans through chamber or air, the heating degree of the internal of the heated coffee beans and that of the outside surfaces of the heated coffee beans have different levels, thereby affecting the smell and flavor of the coffee beans. On the other hand, since non-penetrating heat source is usually burning gas or charcoal, causing that the heating device using non-penetrating heat source is difficult to be miniaturized. As a result, the heating device with non-penetrating heat source is known having a principal drawback of large volume and high potential danger in use.

For above reasons, there is a heating device which uses a penetrating heat source for increasing efficiency and safety of coffee beans roasting process, and the said heating device is microwave oven. As the engineers skilled in microwave technique know, microwave would form standing waves in a specific chamber and then causes uneven heating to those coffee beans disposed in the chamber. FIG. 1 shows a stereo view of a conventional coffee bean roasting device. As shown in FIG. 1, the conventional coffee bean roasting device comprises: a chamber 11', a rotary plate 12', a cone unit 13', and a fixing element 14'. During a normal operation of the coffee bean roasting device 1', the cone unit 13' is driven to rotate by the rotary plate 12' in the chamber 11'. Although the conventional coffee bean roasting device 1' is capable of increasing the uniformity of heating degree of the coffee beans heated by microwave, steam, produced under the coffee beans roasting process using microwave, is found that would be remained in the chamber so as to influence the quality of the heated coffee beans. Besides, after the coffee bean roasting device 1' is operated to achieve the coffee beans roasting process, it needs to rapidly make the temperature of the heated coffee beans be cooled down in a short time, in order to prevent the heated coffee beans from overheating.

Through above descriptions, it is known that there is still room for improvement in the conventional coffee bean roasting device. In view of that, inventors of the present application have made great efforts to make inventive research thereon and eventually provided a coaxial microwave rotary applicator for material processing.

SUMMARY OF THE INVENTION

The primary objective of the present invention is to provide a coaxial microwave rotary applicator for material processing, comprising: a waveguide unit, a microwave generator connected to one end of the waveguide unit, a bearing unit, a chamber, a rotary shaft, a driver unit, a sampling unit. The bearing unit is connected to the waveguide unit through a non-rotary ring, and the chamber is connected to a rotary ring of the bearing unit, and the microwave generator is configured for supplying a microwave to the chamber. By such arrangements, it is able to uniformly heat a specific material disposed in the chamber by driving the chamber to rotate. It is worth noting that, a user is allowed to clearly observe the processing progress via the sampling unit during the heating process of the specific material.

For achieving the primary objective of the present invention, the inventor of the present invention provides a coaxial microwave rotary applicator for material processing, comprising:

a waveguide unit;

a microwave generator, being connected to one end of the waveguide unit;

a bearing unit, being connected to the other end of the waveguide unit by a non-rotary ring;

a chamber, being connected to a rotary ring of the bearing unit, and the microwave generator being configured for supplying a microwave into the chamber;

a rotary shaft, being connected to the chamber by one end thereof;

a driver unit, being connected to the other end of the rotary shaft to drive the rotary shaft, so as to rotate the chamber; and a sampling unit, being connected to the non-rotary ring of the bearing unit.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a monitoring device, embodiments of the present invention will be described in detail with reference to the attached drawings hereinafter.

First Embodiment

Figure 1:
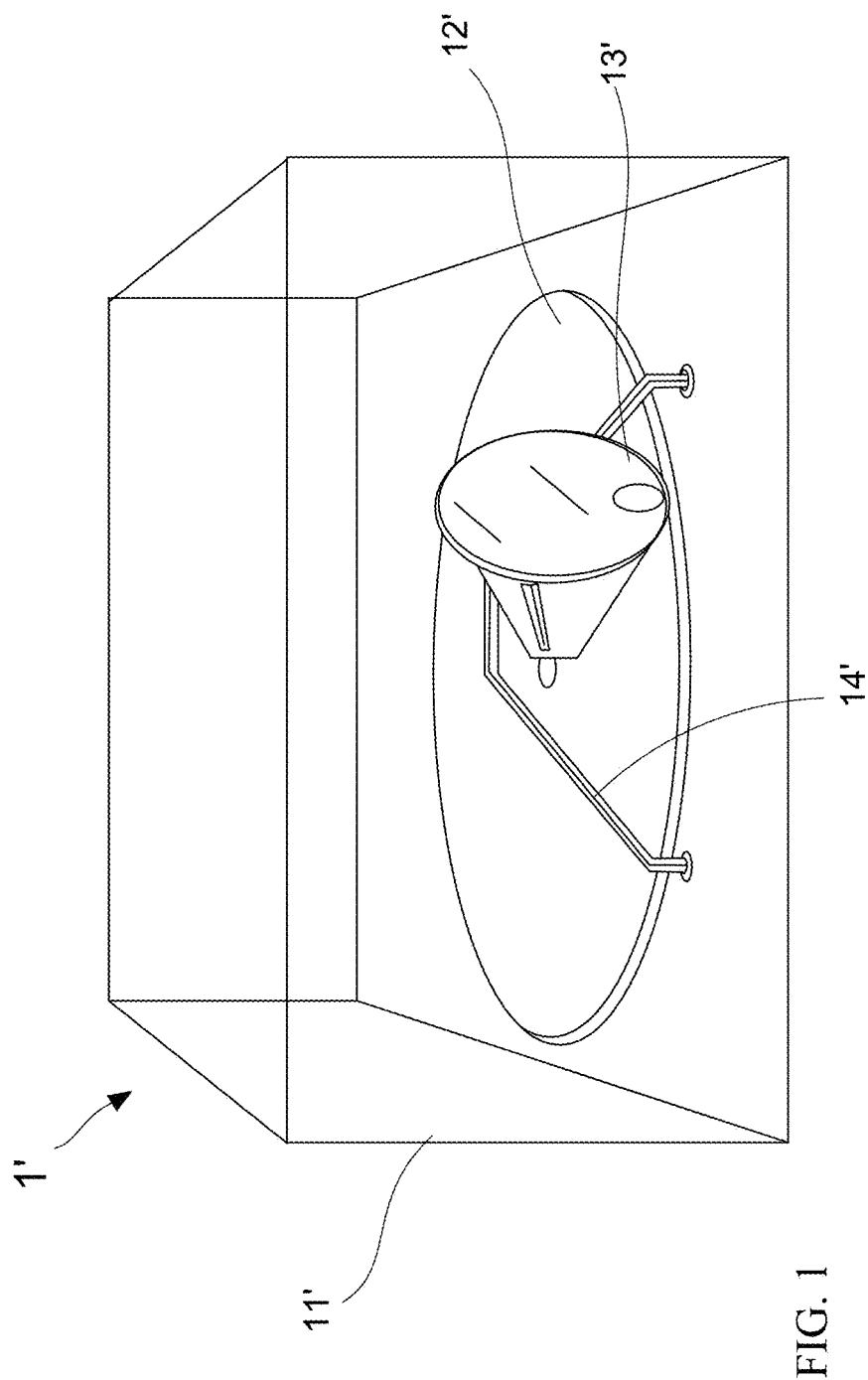
FIG. 1 shows a stereo view of a conventional coffee bean roasting device.
Figure 2:
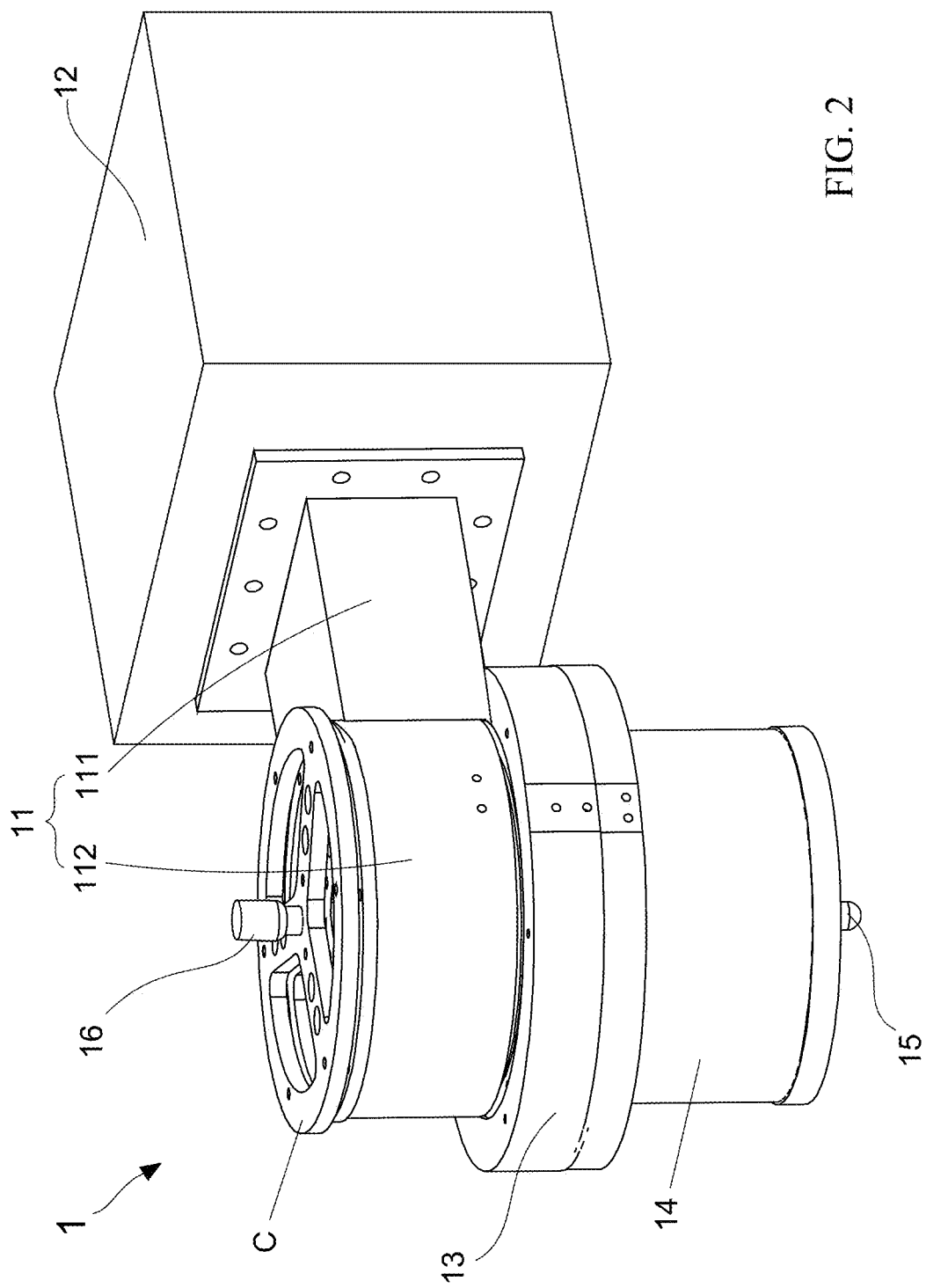
FIG. 2 shows a first stereo diagram of the first embodiment of a coaxial microwave rotary applicator.
Figure 3:
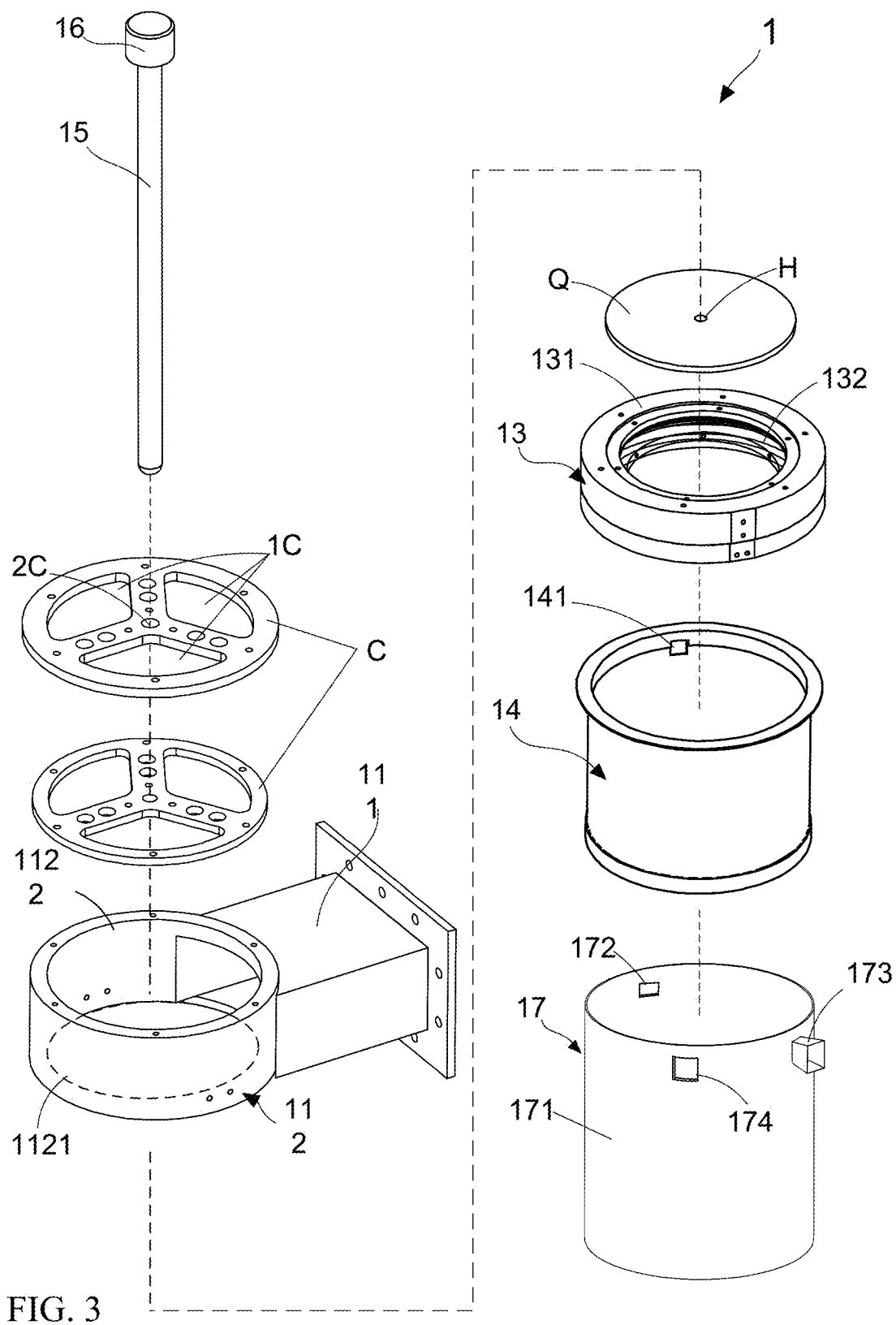
FIG. 3 shows a first exploded diagram of the first embodiment of the coaxial microwave rotary applicator.

With reference to FIG. 2, there is provided a first stereo diagram of the first embodiment of a coaxial microwave rotary applicator. Please simultaneously refer to FIG. 3, which shows a first exploded diagram of the first embodiment of the coaxial microwave rotary applicator. As shown in FIG. 2 and FIG. 3, it is able to know that the coaxial microwave rotary applicator 1 of the present invention comprises: a waveguide unit 11, a microwave generator 12, a bearing unit 13, a chamber 14, a rotary shaft 15, a driver unit 16, and a sampling unit 17. The microwave generator 12 is connected to one end of the waveguide unit 11, and the bearing unit 13 is connected to the other end of the waveguide unit 11 by a non-rotary ring 131. Moreover, the chamber 14 is connected to a rotary ring 132 of the bearing unit 13. According to FIG. 3, it is able to know that, one end of the rotary shaft 15 is connected to the chamber 14, and the other end of the rotary shaft 15 is connected to the driver unit 16. By such arrangements, the driver unit 16 drives the rotary shaft 15 to rotate, so as to rotate the chamber 14. Furthermore, the microwave generator 12 is configured for supplying a microwave into the chamber 14, such that the coaxial microwave rotary applicator for material processing 1 is capable of heating a specific material disposed in the chamber 14 uniformly. It is worth noting that, the sampling unit 17 is connected to the non-rotary ring 131 of the bearing unit 13.

Inheriting to above descriptions, it needs further explain that, the waveguide unit 11 comprises: a waveguide tube 111 and an adapter tube 112. Wherein one end of the waveguide tube 111 is connected to the microwave generator 12. Besides, the adapter tube 112 is connected to the other end of the waveguide tube 111, and a first opening 1121 of the adapter tube 12 is connected to the non-rotary ring 131, so as to connect with the chamber 14. It needs to further explain that, the sampling unit 17 comprises: a hollow cylinder 171, a sampling opening 172, a feed-in portion 173, and a hole 174. According to FIG. 3, it is able to know that, the hollow cylinder 171 is used for confining the chamber 14 therein. Besides, the sampling opening 172 is formed on one side of the hollow cylinder 171, and it is correspondingly faced to a material sampling hole 141 formed on one side of the chamber 14. It is worth noting that, the feed-in portion 173 is formed on the hollow cylinder 171, and it is arranged to correspondingly face to a material feed-in hole 141 formed on one side of the chamber 14. At the same time, the hole 174 is formed on the hollow cylinder 171, and it is arranged to correspondingly face to a material feed-out hole 143 formed on one side of the chamber 14. By such arrangements, a user is capable of letting the sampling opening 172 correspondingly to face to the material feed-in hole 141 of the chamber 14 by rotating the hollow cylinder 171, so as to complete a sampling motion. Similarly, the user is capable of letting the hole 174 correspondingly to face to the material feed-out hole of the chamber 14, so as to complete a feed-out motion. It is presumed that the coaxial microwave rotary applicator 1 of the present application is also capable of completing a feed-in motion according the design of the sampling unit 17. Furthermore, after the user completes said motion of sampling, feed-out or feed-in, the user is capable of covering the material feed-in hole 141, sampling hole 172, feed-in portion 173 or hole 174 by at least one cover element or sliding door.

Figure 4:
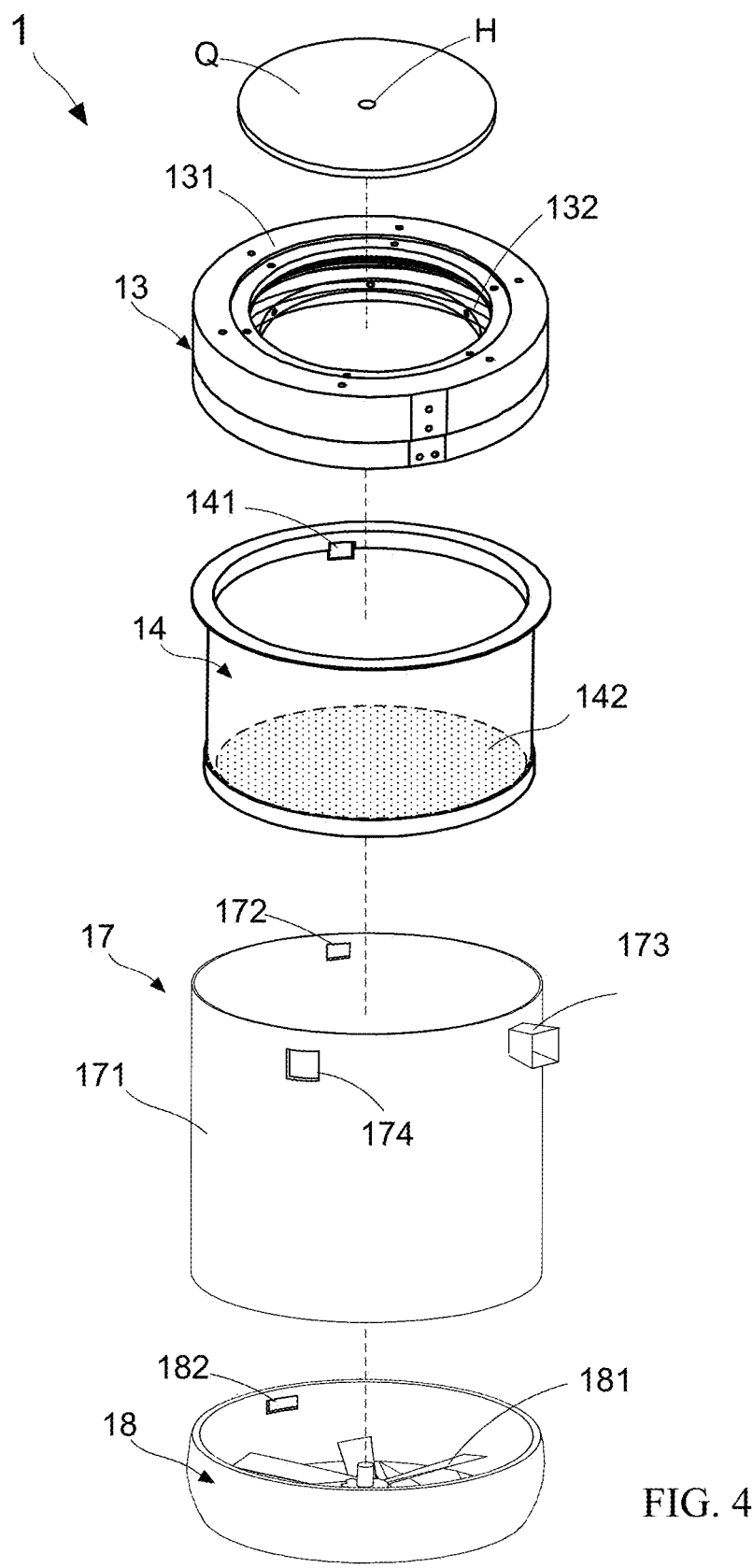
FIG. 4 shows a second exploded diagram of the first embodiment of the coaxial microwave rotary applicator.
Figure 5:
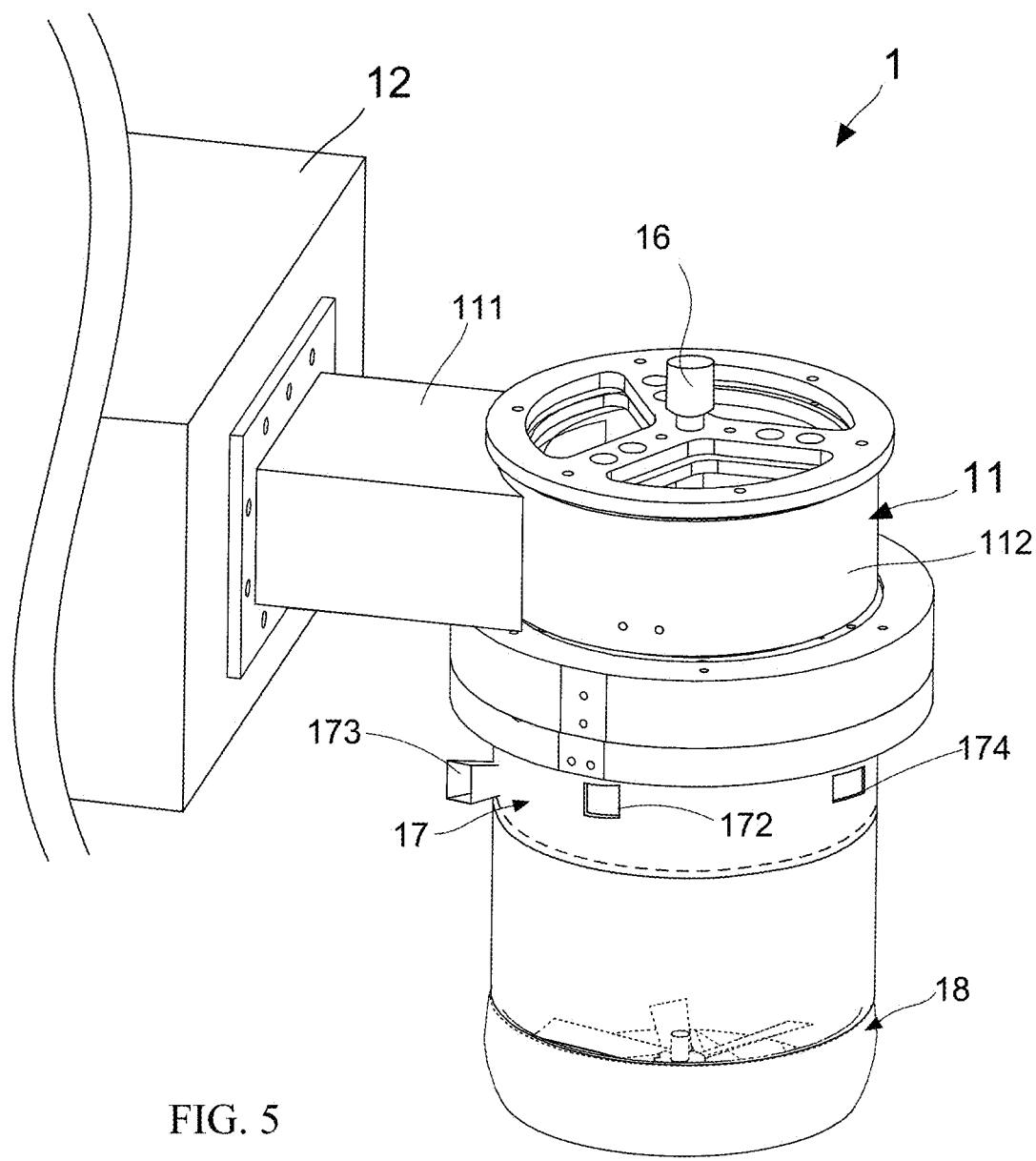
FIG. 5 shows a second stereo diagram of the first embodiment of a coaxial microwave rotary applicator.

Continuously referring to FIG. 3, and please simultaneously refer to FIG. 4 and FIG. 5, which shows a second exploded diagram and second stereo diagram of the first embodiment of the coaxial microwave rotary applicator. As shown in FIG. 4, the coaxial microwave rotary applicator 1 of the present invention further comprises: a transparent sheet Q and a cooling unit 18. Wherein the transparent sheet Q is disposed in the non-rotary ring 131, and the rotary shaft 15 passes through a perforation groove H formed on the transparent sheet Q. It is worth explaining that, the cooling unit 18 is located below the non-rotary ring 131 so as to correspondingly face to at least one ventilation portion 142 formed on the chamber 14, and it comprises: at least one cooling fan 181 and a measuring portion 182. Such that the user is capable of measuring a temperature around the chamber 14 by the measuring portion 182. It needs to explain that, the at least one cooling fan 181 is correspondingly arranged to face the at least one ventilation portion 142 of the chamber 14. By such arrangements, the coaxial microwave rotary applicator 1 is capable of cooling the temperature of the chamber 14 quickly and efficiently by the design of the cooling unit 18. It is worth noting that, the transparent sheet Q is made of quartz glass or polytetrafluoroethylene. According to FIG. 5, it is able to know that, the cooling unit 18 is combined with the sampling unit 17, or the cooling unit 18 is integrated with the sampling unit 17 in production process.

Figure 6:
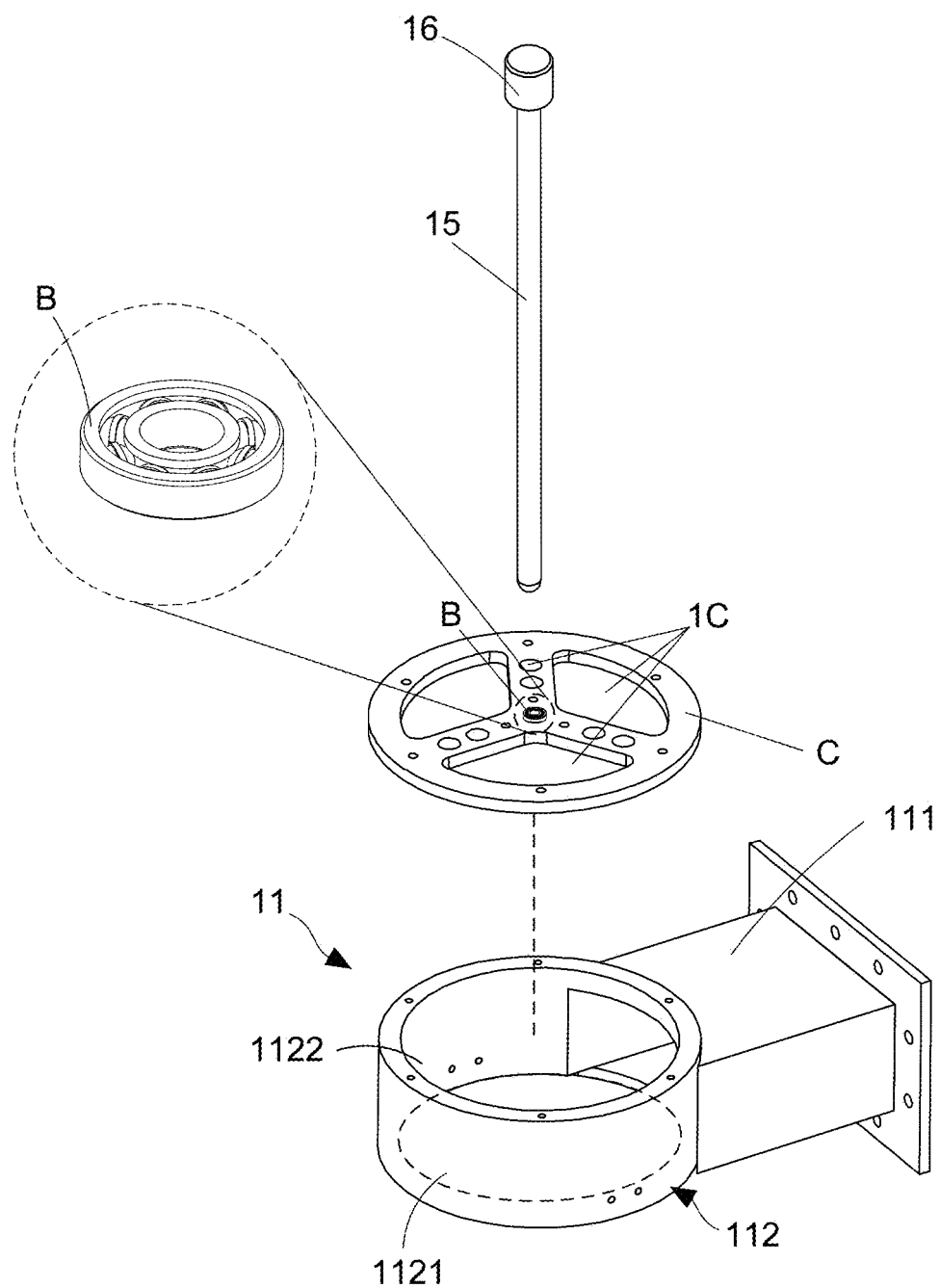
FIG. 6 shows a third exploded diagram of the first embodiment of the coaxial microwave rotary applicator.

Referring to FIG. 2 and FIG. 3 again, and please simultaneously refer to FIG. 6, there is showing a third exploded diagram of the first embodiment of the coaxial microwave rotary applicator. More particularly, the coaxial microwave rotary applicator 1 further comprises at least one lid C and a bearing element B. Wherein the at least one lid C covers on a second opening 1122 of the adapter tube 112 and comprises a plurality of wire holes 1C and an axis hole 2C. Besides, the bearing element B is disposed in the axis hole 2C, and the rotary shaft 15 passes through the bearing element B. By such arrangements, the microwave generator 12 supplies a microwave to the bearing unit 13 through the waveguide unit 11. Furthermore, the microwave passes through the transparent sheet Q and reach chamber 14. As the engineers skilled in microwave technique well know, the microwave doesn't uniformly heat a specific material disposed in the chamber 14. Therefore, the coaxial microwave rotary applicator 1 of the present invention rotates the rotary shaft 15 by the driver unit 16, and drive the chamber 14 to rotate. It is worth noting that, the present invention is capable of adjusting output power, microwave mode and heating time according to different type of the specific material by designs of coaxial resonator and rotary chamber, so as to the coaxial microwave rotary applicator 1 has the advantage of high-efficiency, high-stability and high uniformity. On the other hand, due to the rotary shaft 15 disposed in the middle of the chamber is a metal stick, the rotary shaft 15 is capable of gathering electromagnetic field during the heating process. On the other words, the material passes through the area of high-efficiency heating by properly adjusting the rotary speed of the chamber 14, so as to heat the specific material with efficiency.

Second Embodiment

Figure 7:
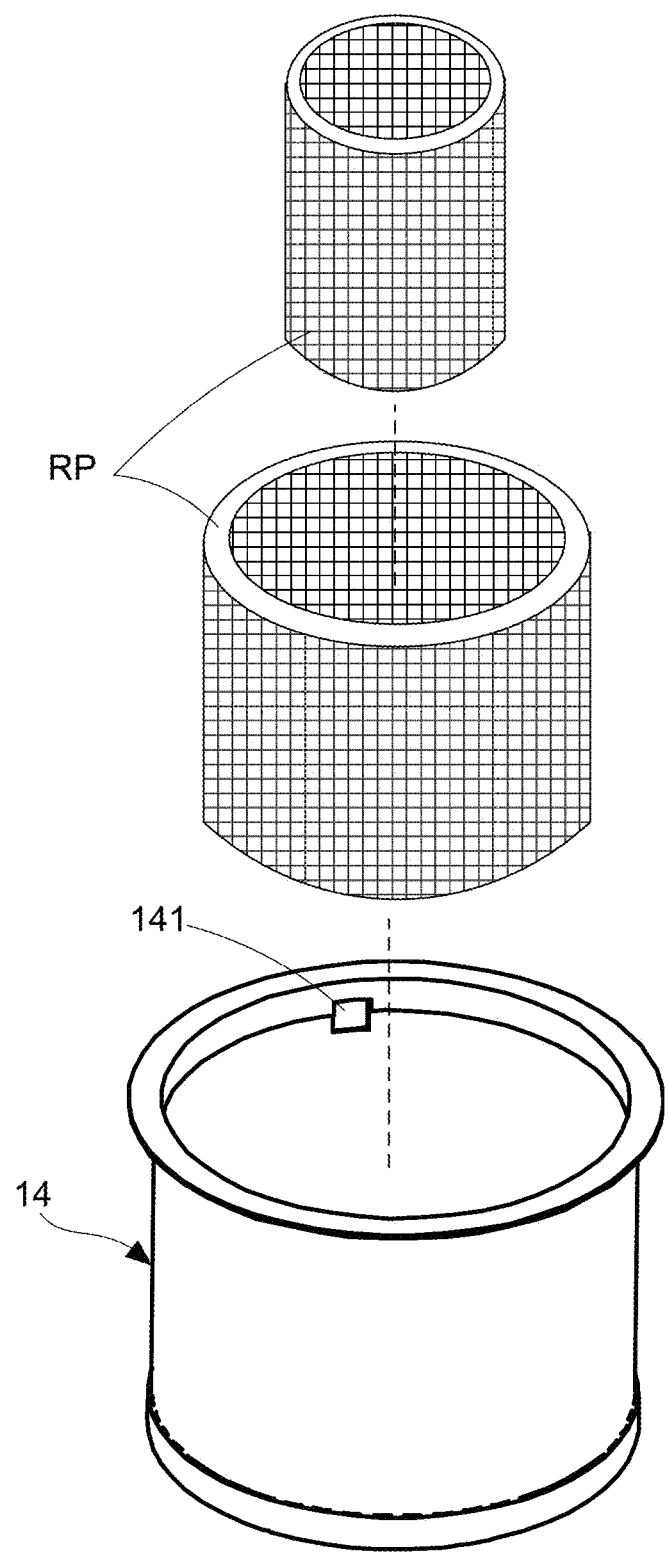
FIG. 7 shows a first schematic stereo diagram of a plurality of isolation members and a chamber.
Figure 8:
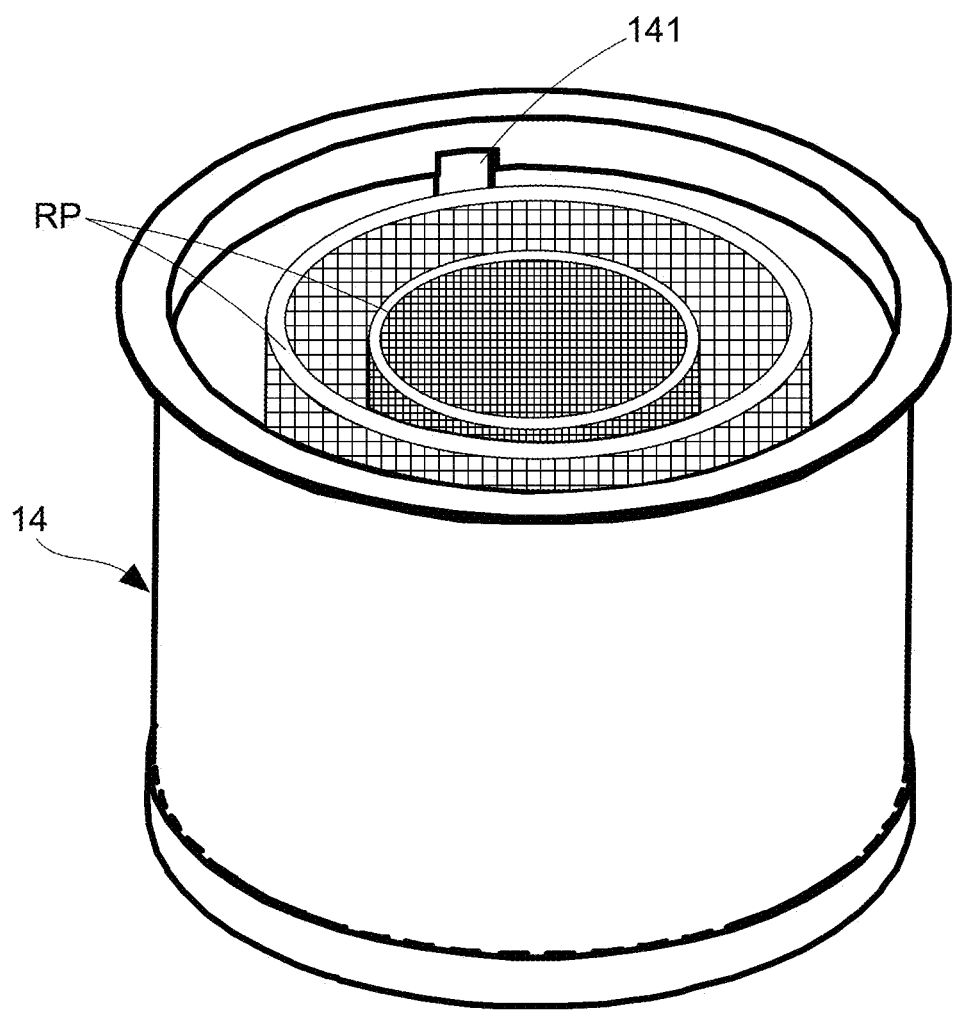
FIG. 8 shows a second schematic stereo diagram of the plurality of isolation members and the chamber.

Referring to FIG. 7, which shows a first schematic stereo diagram of a plurality of isolation members and a chamber, and please simultaneously refer to FIG. 8, there is showing a second schematic stereo diagram of a plurality of isolation members and a chamber. According to FIG. 3 and FIG. 7, it is able to know that, the second embodiment of the coaxial microwave rotary applicator 1 further comprise a plurality of isolation members RP. Wherein the plurality of isolation members RP are disposed in the chamber 14, and the plurality of isolation members RP are built in the form of a thin piece and formed various shapes, such as hollow cylinder or column. It is worth noting that, by the design of the isolation member RP, the user put the isolation member RP on proper place according to a characteristic of the material, such that the present invention is able to heat different type of the material in the meantime. For instance, coffee beans of cinnamon roast are disposed in the area where received low-microwave energy, and coffee beans of dark roast are disposed in the area where received high-microwave energy. It is presumed that the user is capable of separating the material from the rotary shaft 15 disposed in the middle of the chamber 14. Briefly speaking, the coaxial microwave rotary applicator 1 of the present invention is able to roast different type of material at the same time.

Third Embodiment

Figure 9:
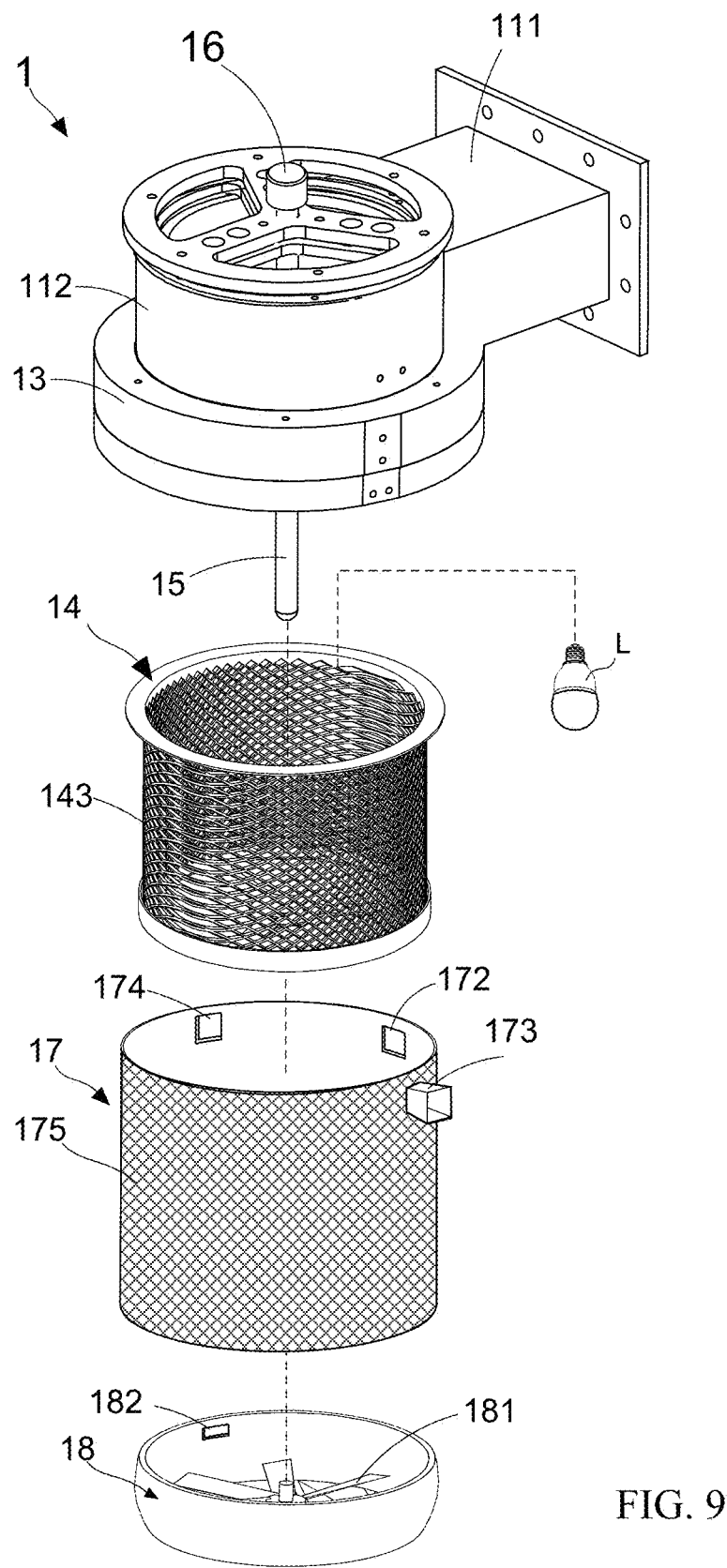
FIG. 9 shows a schematic stereo diagram of the third demonstration of the coaxial microwave rotary applicator.

Referring to FIG. 9, which shows a schematic stereo diagram of the third demonstration of the coaxial microwave rotary applicator. After comparing FIG. 9 with FIG. 3, it is able to find that the third embodiment of the coaxial microwave rotary applicator 1 further comprises: a first viewing portion 143, a second viewing portion 175 and a lighting unit L. Wherein the first viewing portion 143 is formed on one side of the chamber 14, and the second viewing portion 175 is formed on one side of the hollow cylinder 171. It is worth noting that, the chamber 14 and/or the hollow cylinder 171 can be built in the form of multi-aperture structure or fine mesh structure. By such arrangements, the user is allowed to observe inside of the chamber 14 during the heating process. Besides, the lighting unit L is used for providing an illumination light into the chamber, such that the user is able to observe inside of the chamber 14 clearly by the first viewing portion 143 and the second viewing portion 175. It the present invention, steam formed from roasted coffee beans is removed from the chamber 14 by the at least one cooling fan 181 of the cooling unit 18, so as to keep the material disposed in the chamber 14 to dry and rapidly reduce thereof temperature until same of room temperature.

Fourth Embodiment

Figure 10:
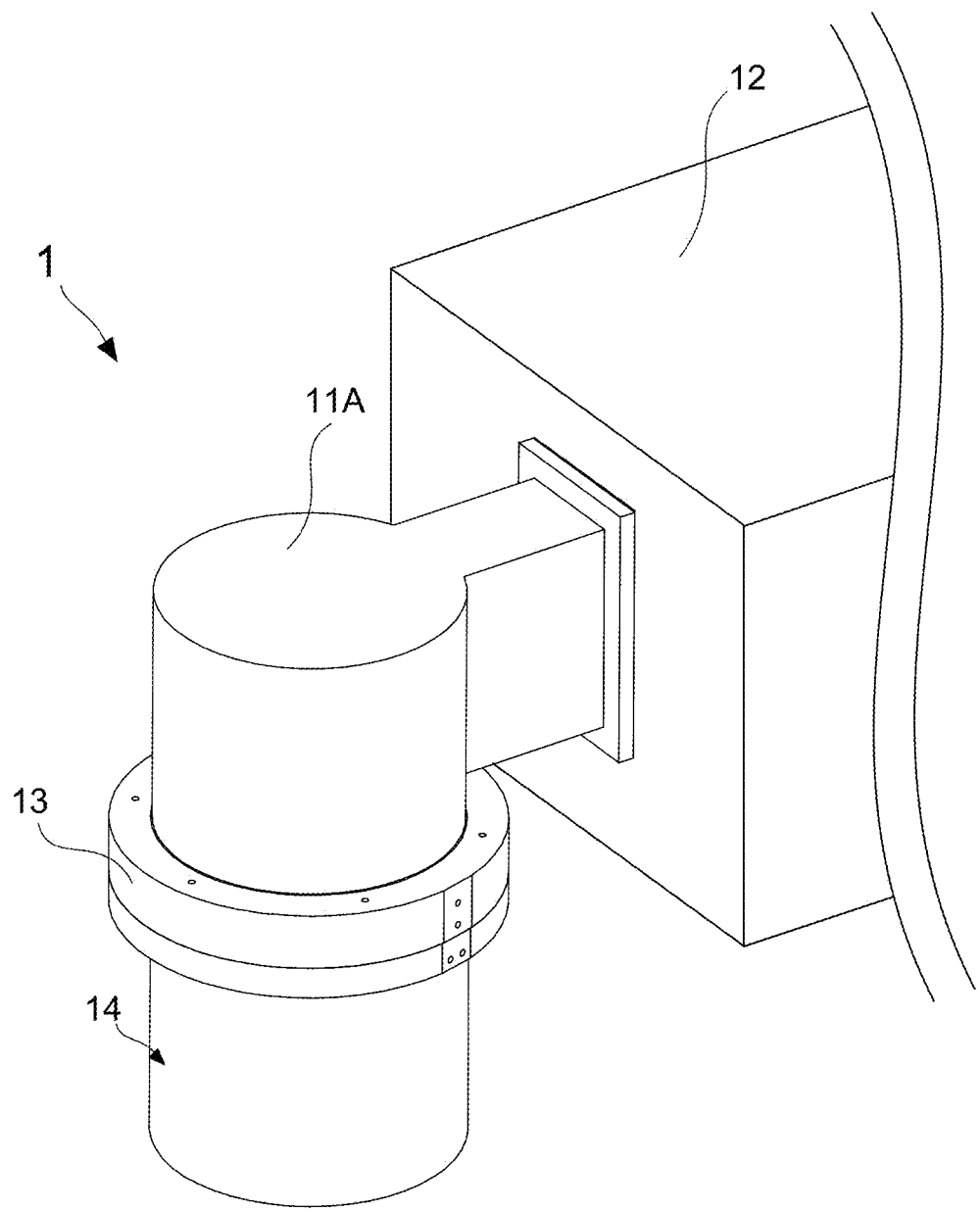
FIG. 10 shows a stereo diagram of the fourth demonstration of the coaxial microwave rotary applicator.
Figure 11:
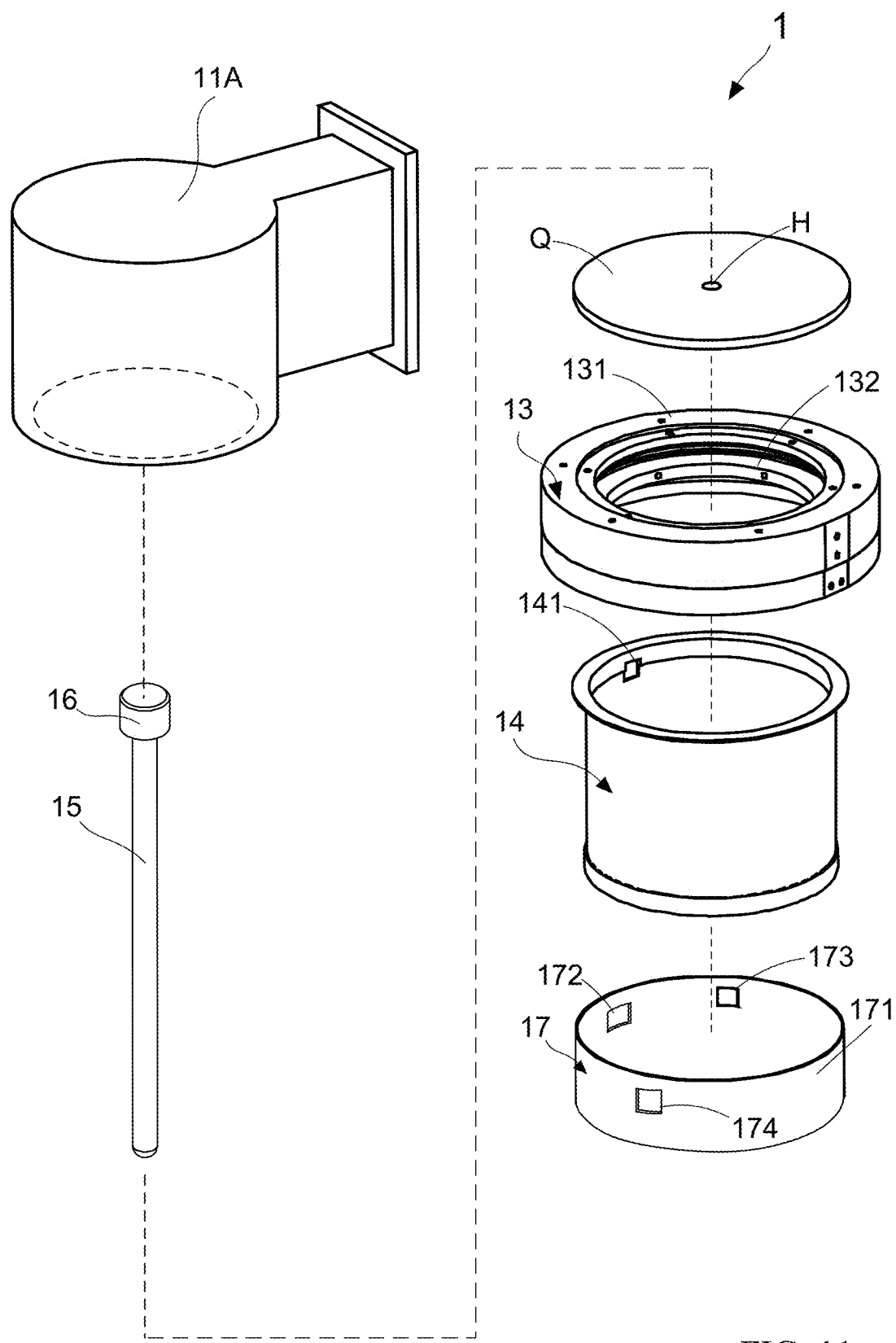
FIG. 11 shows an exploded diagram of the fourth embodiment of the coaxial microwave rotary applicator.

Referring to FIG. 10, which shows a stereo diagram of the fourth demonstration of the coaxial microwave rotary applicator, and please simultaneously refer to FIG. 11, there is showing an exploded diagram of the fourth embodiment of the coaxial microwave rotary applicator. After comparing FIG. 10 with FIG. 3, it is able to know that, in the fourth embodiment the waveguide unit 11 of first embodiment integrated with the at least one lid C to form a waveguide unit 11A. As shown in FIG. 11, the driver unit 16 is disposed in the waveguide unit 11A. Furthermore, the coaxial microwave rotary applicator 1 of the present invention can be used with at least one shielding unit for protecting or isolating element disposed in the microwave energy.

Through above descriptions, the coaxial microwave rotary applicator 1 of the present invention has been introduced completely and clearly; in summary, the present invention includes the advantages of:

(1) Disclosures of the present invention describe a coaxial microwave rotary applicator 1 for material processing, mainly comprising: a waveguide unit 11, a microwave generator 12 connected to one end of the waveguide unit 11, a bearing unit 13, a chamber 14, a rotary shaft 15, a driver unit 16, a sampling unit 17. The bearing unit 13 is connected to the waveguide unit 11 through a non-rotary ring 131, and the chamber 14 is connected to a rotary ring 132 of the bearing unit 13. In the present invention, the microwave generator 12 is configured for supplying a microwave to the chamber 14. By such arrangements, the coaxial microwave rotary applicator 1 is able to uniformly heat a specific material disposed in the chamber 14 by driving the chamber 14 to rotate. It is worth noting that, a user is allowed to clearly confirm the heating degree of the specific material via the sampling unit 17 during the heating process. One of the functions of the present invention is heating and roasting coffee beans via microwave energy, however it is presumed that the coaxial microwave rotary applicator 1 is used for roasting, heating or drying other material, such as peanuts, beans, vegetable and tea leaves.

(2) Different from resonant mode generated from commercial resonant chamber, the coaxial microwave rotary applicator 1 of the present invention is able to gather electromagnetic energy more efficiency, so as to enhance the uniformity and efficiency. Furthermore, the rotary shaft 15 is a metal stick disposed in center of the coaxial microwave rotary applicator 1.

The above description is made on embodiments of the present invention. However, the embodiments are not intended to limit scope of the present invention, and all equivalent implementations or alterations within the spirit of the present invention still fall within the scope of the present invention.

What is claimed is:

1. A coaxial microwave rotary applicator for material processing, comprising:
   a microwave generator;
   a waveguide tube, being connected to the microwave generator;
   an adapter tube, being connected to the waveguide tube by a side thereof, and having a first opening and a second opening;
   a bearing, being connected to the first opening of the adapter tube;
   a lid, being connected to the second opening of the adapter tube, and comprising a plurality of wire holes and an axis hole, wherein the bearing is disposed in the axis hole;
   a chamber being connected to a rotary ring of the bearing by a top opening thereof, such that the microwave generator is allowed to supply a microwave into the chamber through the waveguide tube and the adapter tube;
   a rotary shaft, wherein a first end of the rotary shaft sequentially passes through the axis hole and the bearing located in the axis hole, the adapter tube, and the bearing, so as to connect the chamber;

a motor, being connected to a second end of the rotary shaft; and a hollow cylindrical member, being connected to the bearing by a top opening thereof, and accommodating the chamber therein.

2. The coaxial microwave rotary applicator of claim 1, wherein a material feeding opening, a first sample withdrawing opening and a first material discharging opening are formed on one side of the hollow cylindrical member, and a second sample withdrawing opening and a second material discharging opening are formed on one side of the chamber.

3. The coaxial microwave rotary applicator of claim 1, further comprising:

a transparent sheet, being disposed in the bearing, so as to be positioned over the top opening of the chamber; wherein the transparent sheet is provided with a through hole thereon, and the rotary shaft passing through the through hole so as to connect the chamber.

4. The coaxial microwave rotary applicator of claim 1, wherein a mesh plate comprising a plurality of vents is connected to a bottom opening of the chamber, and a cooling device having a cooling fan is connected to a bottom opening of the hollow cylindrical member.

5. The coaxial microwave rotary applicator of claim 1, further comprising:

a plurality of isolation members, being disposed in the chamber for separating an internal of the chamber into a plurality of processing spaces.

6. The coaxial microwave rotary applicator of claim 1, further comprising:

a first viewing window, being formed on one side of the chamber; and a second viewing window, being formed on one side of the hollow cylinder.

7. The coaxial microwave rotary applicator of claim 6, further comprising:

a light source, being used for providing an illumination light into the chamber.

* * * * *